(12) United States Patent
Narendra

(10) Patent No.: US 9,317,796 B2
(45) Date of Patent: Apr. 19, 2016

(54) RF PROBE ALIGNMENT WITH PASSIVE TAG

(71) Applicant: Tyfone, Inc., Portland, OR (US)

(72) Inventor: Siva G. Narendra, Portland, OR (US)

(73) Assignee: Tyfone, Inc., Portland, OR (US)

( * ) Notice: Subject to any disclaimer, the term of this patent is extended or adjusted under 35 U.S.C. 154(b) by 181 days.

(21) Appl. No.: 14/244,853

(22) Filed: Apr. 3, 2014

(65) Prior Publication Data

US 2015/0286850 A1  Oct. 8, 2015

(51) Int. Cl.
  H04Q 5/22 (2006.01)
  G06K 19/07 (2006.01)
  G06K 7/10 (2006.01)

(52) U.S. Cl.
  CPC ........ G06K 19/0724 (2013.01); G06K 7/10356 (2013.01)

(58) Field of Classification Search
  CPC .......... G06K 19/0709; G06K 19/0724; G06K 7/10138; G06K 7/10158; G06K 7/10316; G06K 7/10356; A61B 8/4472
  See application file for complete search history.

(56) References Cited

U.S. PATENT DOCUMENTS

| | | | |
|---|---|---|---|
| 3,859,624 A | 1/1975 | Kriofsky et al. | |
| 5,250,944 A | 10/1993 | Urbas et al. | |
| 5,347,262 A | 9/1994 | Thurmond et al. | |
| 6,349,881 B1 * | 2/2002 | Wilkey | G06K 19/04 235/382 |
| 7,837,694 B2 * | 11/2010 | Tethrake | A61B 19/00 340/572.1 |
| 2004/0203478 A1 | 10/2004 | Scott | |
| 2007/0057797 A1 | 3/2007 | Waldner et al. | |
| 2007/0096881 A1 | 5/2007 | Pillai | |
| 2007/0205871 A1 | 9/2007 | Posamentier | |
| 2008/0029590 A1 | 2/2008 | Zosimadis et al. | |
| 2009/0009337 A1 | 1/2009 | Rofougaran | |
| 2009/0295543 A1 | 12/2009 | Kita | |
| 2010/0295682 A1 | 11/2010 | August et al. | |
| 2011/0133894 A1 | 6/2011 | Hennig et al. | |
| 2013/0015960 A1 | 1/2013 | Kaga et al. | |
| 2014/0240100 A1 * | 8/2014 | Johns | G06K 19/0723 340/10.6 |

OTHER PUBLICATIONS

Athas, William C., Low-Power Digital Systems Based on Adiabatic-Switching Principles, Dec. 1994, 10 pages, vol. 2 No. 4, IEEE Transactions on Very Large Scale Integration (VLSI) Systems.
U.S. Appl. No. 14/244,845 Office Action dated Oct. 2, 2015, 19 pages.
U.S. Appl. No. 14/244,852 Office Action dated Jan. 7, 2016, 18 pages.

* cited by examiner

*Primary Examiner* — Kerri McNally
*Assistant Examiner* — Renee Dorsey
(74) *Attorney, Agent, or Firm* — Dana B. LeMoine

(57) ABSTRACT

A passive tag embedded in a package includes multiple conductive coils. A first coil receives radio frequency (RF) energy used to power the tag. Additional coils receive and/or transmit data signals, clock signals, and carrier signals. The RF energy and other signals may be at different frequencies. An RF probe includes a first coil to emit the RF energy to power the tag. The RF probe includes additional coils corresponding to the additional coils in the tag. The RF probe may turn off the RF signal used for power during communication. The RF energy may be rectified to provide DC power to circuits in the tag, or may be used directly for adiabatic circuits. The RF probe and the package may have complementary shapes to facilitate alignment of the coils.

20 Claims, 12 Drawing Sheets

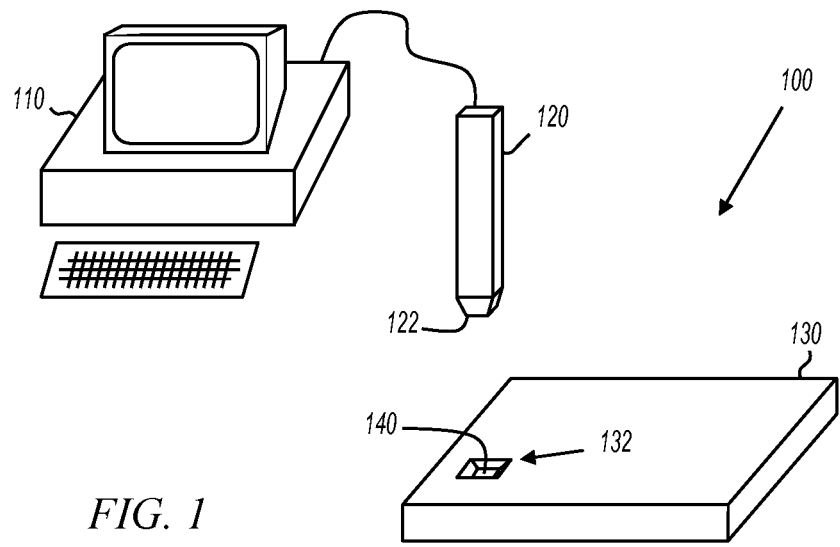
FIG. 1
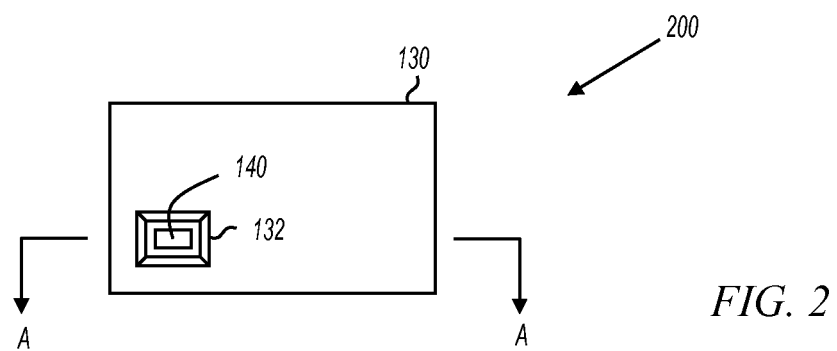
FIG. 2
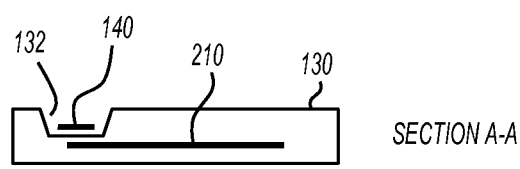
SECTION A-A

RF PROBE ALIGNMENT WITH PASSIVE TAG

FIELD

The present invention relates generally to passive radio frequency (RF) tags, and more specifically to communications with passive RF tags.

BACKGROUND

Passive RF tags are used for many purposes, such as inventory control and records tracking. Passive RF tags include a conductive coil that is used to scavenge energy from an interrogating RF field. The interrogating RF field and the conductive coil are also used for data communications. Interrogating RF fields are typically at 13.56 MHz, and conductive coils are typically a few centimeters in diameter.

BRIEF DESCRIPTION OF THE DRAWINGS

FIG. 1 shows a system including a radio frequency (RF) probe and a passive tag;

FIG. 2 shows a top view and section view of a package that includes a passive tag;

DETAILED DESCRIPTION

Figure 3:
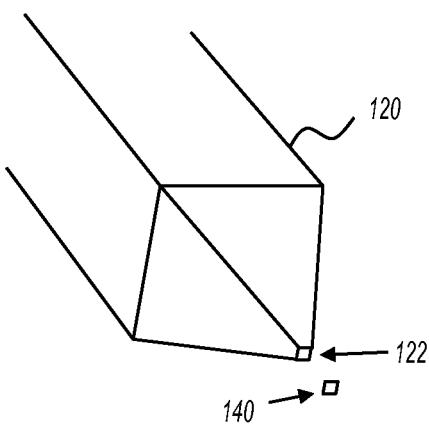
FIG. 3 shows a tip of an RF probe and a passive RF tag.

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a system including a radio frequency (RF) probe and a passive tag. System 100 includes computer 110, RF probe 120, package 130, and passive tag 140. In embodiments represented by FIG. 1, passive tag 140 is affixed to package 130 in a tamper-proof manner. For example, passive tag 140 may be embedded in an indentation 132 of the package in a manner that causes the tag to be destroyed if attempts are made to remove it.

In operation, RF probe 120 emits an RF signal used to power passive tag 140. Passive tag 140 receives the RF signal and scavenges enough energy to operate circuitry in the tag. When the tag has enough power to operate, data communications can take place between RF probe 120 and passive tag 140. Computer 110 is in communication with RF probe 120, and can perform any suitable data processing tasks. For example, in some embodiments, computer 110 performs identity verification of passive tag 140.

As described further below, passive tag 140 includes multiple conductive coils used for different purposes. One of the conductive coils is used to scavenge power from an RF signal transmitted by the RF coil. Other coils are used in various combinations for one or more of receiving and transmitting data, receiving a clock signal, and receiving a carrier signal.

RF probe 120 also includes multiple conductive coils used for different purposes. For example, one of the conductive coils is used to emit RF energy to power passive tag 140. Other coils are used in various combinations for one or more of receiving and transmitting data, transmitting a clock signal, and transmitting a carrier signal.

In some embodiments, each of the multiple conductive coils in passive tag 140 correspond to a respective coil in RF probe 120, and the coils are placed in close proximity to each other to effect communications. Various embodiments of the present invention include mechanisms to ensure alignment of the RF probe and the tag, thereby ensuring alignment of the coils to effect communications.

In some embodiments, power transfer occurs at a first frequency and the remainder of communications occur at a second frequency. For example, RF probe 120 may transmit RF energy at 5.8 GHz, and passive tag 120 may scavenge power at the same frequency. In this example, the remainder of the communications may occur at 2.4 GHz. In other embodiments, power transfer and communications occur at the same frequency. For example, power transfer and data communications may all occur at 5.8 GHz. Any frequency may be used for power transfer and/or data communications without departing from the scope of the present invention.

In some embodiments, the RF signal used for power transfer remains on during an entire time that the RF probe and the tag are communicating. For example, the RF probe may transmit a RF signal to power the tag while also transmitting an RF signal that has a clock signal and/or data signal modulated thereon. In other embodiments, the RF signal used for power transfer is turned off when data transfer takes place. For example, the RF probe may transmit the RF signal used for power transfer for a period of time, and the the RF probe may stop transmitting the RF signal used for power transfer and start transmitting RF signal(s) used for data transfer. These and other embodiments are more fully described below with reference to the remaining figures.

FIG. 2 shows a top view and section view of a package that includes a passive tag. Top view 200 shows passive tag 140 embedded in package 130. Package 130 may be any type of package. For example, in some embodiments, package 130 encases a product 210, and the product is an item being tracked using passive tag 140. The product within package 130 may be an integrated circuit, and package 130 may be an integrated circuit package such as a quad flat pack (QFP), or any other type of package.

As shown in section A-A of FIG. 2, some embodiments include an indentation 132 in package 130 within which passive tag 140 is affixed. Passive tag 140 may be affixed to package 130 in any manner. For example, in some embodiments, passive tag 140 is embedded in an epoxy layer within indentation 132. Also for example, in some embodiments, passive tag 140 is embedded within the package such that some of the package material is above the passive tag.

Passive tag 140 is small. In some embodiments, passive tag 140 is 100 microns square. In other embodiments, passive tag 140 is larger than 100 microns square, and in still further embodiments, passive tag 140 is smaller than 100 microns square. In some embodiments, passive tag 140 is a bare semiconductor die, and in other embodiments, passive tag 140 is enclosed within its own package.

The various elements of FIG. 2 are not shown to scale. Specifically, the sizes of passive tag 140 and indentation 132 are greatly exaggerated. In some embodiments, package 130 is large enough to be handled by a human hand, whereas passive tag 140 is barely visible to the human eye.

FIG. 3 shows a tip of an RF probe and a passive RF tag. RF probe 120 includes a tip 122 that is smaller than the main body of the RF probe. In some embodiments, the tip 122 is substantially the same size as passive tag 140. In other embodiments, tip 122 is larger than passive tag 140, and in still further embodiments, tip 122 is smaller than passive tag 140. RF probe 120, tip 122, and passive tag 140 are not drawn to scale. For example, in some embodiments, RF probe is sized to be comfortably held in a human hand, and passive tag 140 is small enough so as to be barely visible to the human eye.

In operation, tip 122 is placed in the vicinity of passive tag 140, and RF energy emitted by the RF probe 120 is scavenged by passive tag 140 to power circuitry that is included in the passive tag. Data communication between the RF probe and the passive tag may commence after the passive tag is powered. In some embodiments, both the RF probe and the passive tag include a first conductive coil for emitting (RF probe) and scavenging (passive tag) RF energy. Also in some embodiments, both the RF probe and the passive tag include additional coils used for other purposes. These embodiments and others are more fully described below.

Figure 4:
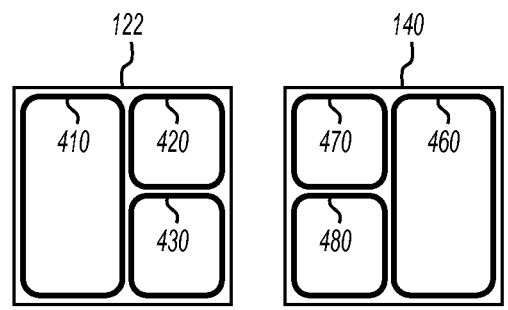
FIG. 4 shows the tip of an RF probe and a passive RF tag, both with three conductive coils affixed thereto.

FIG. 4 shows the tip of an RF probe and a passive RF tag, both with three conductive coils affixed thereto. As used herein, the term "conductive coil" refers to at least one loop of conductive material, where each loop is referred to as a "turn." Passive tag 140 is shown including three conductive coils, each with a plurality of turns. Passive tag 140 is shown having a footprint that corresponds to the outermost rectangle. In some embodiments, coils 460, 470, and 480 are all within the footprint of passive tag 140, and in other embodiments, a portion of one or more coils is outside the footprint of the passive tag 140.

Coils 460, 470, and 480 may be fabricated as part of passive tag, or may be fabricated separately and then attached to passive tag 140. In either case, the coils are considered to be "affixed" to the passive tag. In some embodiments, passive tag 140 is a semiconductor die, and one or more of coils 460, 470, and 480 are formed in one or more metal layers of the semiconductor die. Any number of turns may be included in each coil without departing from the scope of the present invention.

RF probe tip 122 also includes multiple coils 410, 420, and 430. As shown in FIG. 4, each coil in RF probe tip 122 corresponds to one coil in passive tag 140. For example, coil 410 corresponds to coil 460, coil 420 corresponds to coil 470, and coil 430 corresponds to coil 480. When placed in close proximity to each other, the corresponding coils become inductively coupled and can either transfer energy or communicate. For example, in some embodiments, RF probe 120 includes circuitry to drive coil 410 with RF energy at a first frequency. When coils 410 and 460 are inductively coupled, currents are induced in coil 460 that allow circuits electrically coupled to coil 460 to scavenge power. Also for example, RF probe 120 may drive other signals, such as data, clock, or a carrier signal on coils 420 and 430, and passive tag 140 may receive these signals when coil 470 is inductively coupled to coil 420, and coil 480 is inductively coupled to coil 430.

The RF signal used to provide power, and the RF signal(s) used for communications may be at the same or different frequencies. For example, in some embodiments, Coil 410 is driven at 5.8 GHz to provide power to passive tag 140, and coils 420 and 430 are driven at 2.4 GHz. In other embodiments, all coils are driven at 5.8 GHz or 2.4 GHz. In still further embodiments, the coils are driven at frequencies other than 2.4 GHz or 5.8 GHz.

Figure 5:
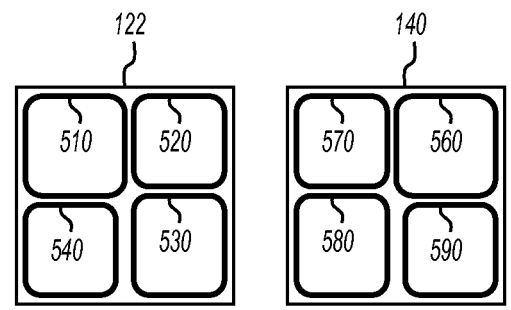
FIG. 5 shows the tip of an RF probe and a passive RF tag, both with four conductive coils affixed thereto.

FIG. 5 shows the tip of an RF probe and a passive RF tag, both with four conductive coils affixed thereto. RF probe tip 122 is shown with coils 510, 520, 530, and 540, and passive tag 140 is shown with coils 560, 570, 580, and 590. When RF probe tip 122 and passive tag 140 are in close proximity, coil 510 inductively couples with coil 560, coil 520 inductively couples with coil 570, coil 530 couples with coil 580, and coil 540 couples with coil 590.

In some embodiments, one coil pair is used to transfer power, and the remaining coil pairs are used for other purposes. For example, the coil pair 510, 560 may be used transfer power, coil pair 520, 570 may be used for bidirectional data transfer, coil pair 530, 580 may be used to provide a clock signal from the RF probe to the passive tag, and coil pair 540, 590 may be used to provide a carrier signal from the RF probe to the passive tag.

The various coils in the RF probe inductively couple with the corresponding coils in the passive tag when the coils are in close proximity and they are sufficiently aligned. If the distance between the coils is too great, or the alignment is too far off, the RF probe cannot effectively communicate with the passive tag. In some embodiments, the RF probe and/or the package include alignment mechanisms to aid in the alignment of the coils in the RF probe tip with the coils in the passive tag. Various alignment mechanisms are described below with reference to FIGS. 6 and 7.

Figure 6:
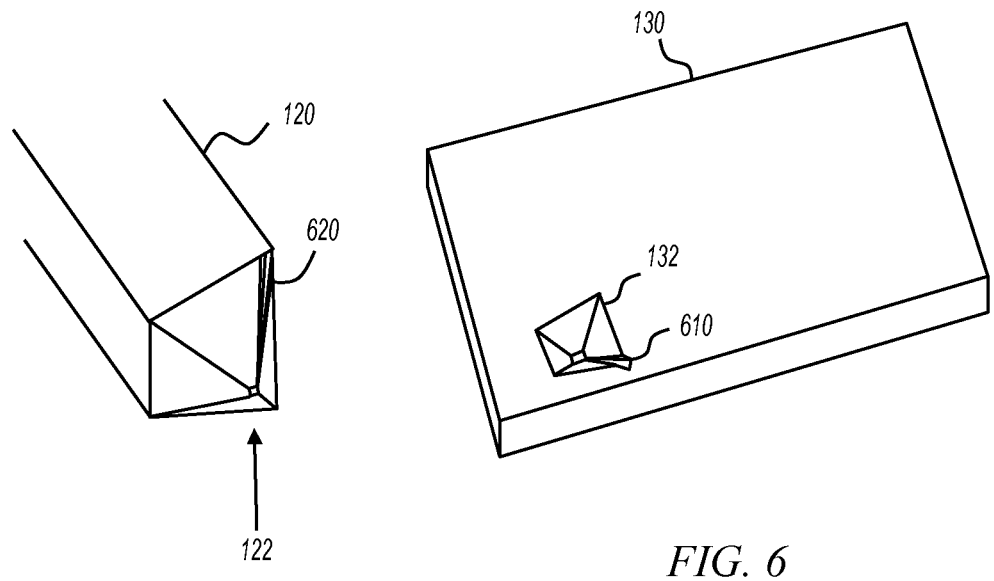
FIG. 6 shows a package with a notched indentation and a matching RF probe.

FIG. 6 shows a package with a notched indentation and a matching RF probe. In embodiments represented by FIG. 6, the shape of the indentation 132 matches a shape of the RF probe 120 to aid in alignment. For example, indentation 132 includes notch 610, and RF probe tip 122 includes protrusion 620, where the shape of the protrusion 620 matches with the shape of notch 610.

Figure 7:
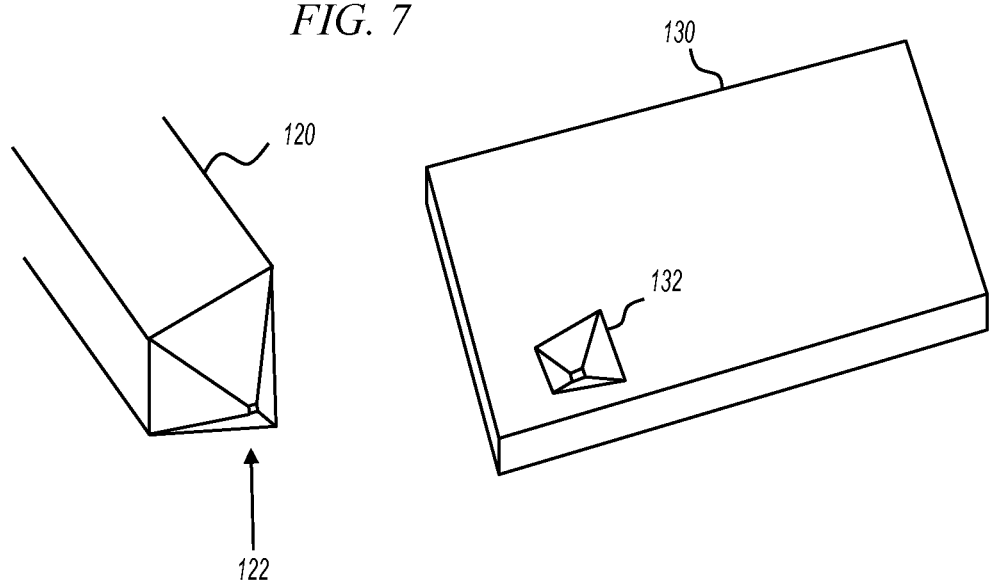
FIG. 7 shows a package with a trapezoidal indentation and a matching RF probe.

FIG. 7 shows a package with a trapezoidal indentation and a matching RF probe. In embodiments represented by FIG. 7, RF probe 120 includes a trapezoidally shaped tip 122. Package 132 also includes a trapezoidally shaped indentation 132 to facilitate alignment of RF probe 120 and package 130.

Notch 610 (FIG. 6) and the trapezoidal shape shown in FIG. 7 are examples of surface features that match features on the RF probe to facilitate alignment of conductive coils. Any surface feature of the package may be paired with any feature of the RF probe tip in order facilitate alignment of the coils without departing from the scope of the present invention. For example, in FIG. 6, the alignment surface feature includes a notch, and in FIG. 7, the alignment surface feature includes a trapezoidal shape.

Figure 8:
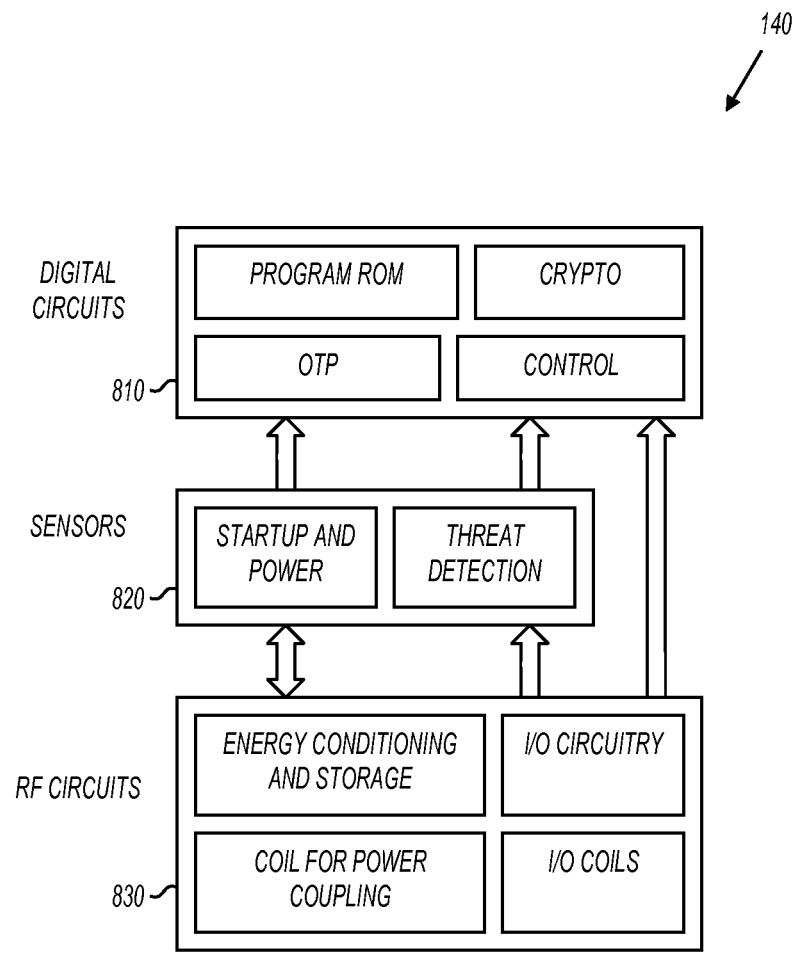
FIG. 8 shows a block diagram of a passive tag.

FIG. 8 shows a block diagram of a passive tag. Passive tag 140 includes digital circuits 810, sensors 820, and RF circuits 830. Digital circuits 810 include program ROM, Cryptographic functions (Crypto), one-time programmable (OTP) device(s), and control circuitry (Control). The Program ROM stores hardcoded program logic that cannot be modified. The OTP stores information that is used to uniquely identify the passive tag. For example, the OTP may store encryption keys and/or chip serial number. In some embodiments, the OTP cells are pre-provisioned during manufacture or test of the passive tag. In some embodiments, the OTP includes a contact pad interface that allows fuses to be blown, but that does not allow reads. In some embodiments, the contact pad interface is removed from the circuit by blowing fuses after the OTP cells are programmed.

The cryptographic function may perform any type of cryptography. For example, in some embodiments, the cryptographic function performs 256-bit AES cryptography. In other embodiments, the cryptographic function performs an asymmetric cryptographic algorithm.

Digital circuits 810 may include any type of control function. For example, in some embodiments, digital circuits 810 include state machine logic that manages the execution of the Program ROM as well as managing control interfacing between the analog and the digital sub-modules.

Sensors 820 includes startup and power circuits and threat detection circuits. The startup and power sensors may be used to determine the right time to power the digital circuits as well as managing power coupling signaling to the RF probe.

The threat detection sensors may detect any type of catastrophic threat and disable the passive tag. For example, in some embodiments, the threat detection sensors include mechanical sensing that results in destruction of the passive tag when tampered with.

RF circuits 830 includes energy conditioning & storage, input/output (I/O) circuitry, a conductive coil for power coupling, and one or more additional conductive coils for I/O. In some embodiments, energy conditioning and storage performs rectification and filtering. For example, some embodiments power the digital circuits with a DC power source. In these embodiments, energy conditioning and storage rectifies the RF energy received on the conductive coil for power coupling, and provides a DC power source to other circuitry. In other embodiments, the digital circuits are adiabatic circuits that utilize the RF signal as a power source directly. Energy storage may be in the form of capacitance in the semiconductor die. Although the amount of energy storage may be small, the power requirements of the passive tag are also small.

The I/O circuitry is electrically coupled to the I/O coils. In some embodiments, the I/O circuitry modulates outgoing data onto carrier signals and demodulates data from carrier signals. The I/O circuitry may also demodulate a clock signal or condition a received carrier signal. Examples of I/O circuitry are discussed below with reference to FIGS. 9-14.

The coil for power coupling and the I/O coils are conductive coils with at least one turn. The coil for power coupling is electrically coupled to the energy conditioning and storage, and the I/O coils are electrically coupled to the I/O circuitry. In some embodiments, each I/O coil has a single dedicated purpose, and in other embodiments, one or more of the I/O coils have a shared purpose. For example, a single I/O coil may be dedicated to an incoming data signal, outgoing data signal, an incoming clock signal, or an incoming carrier signal. Also for example, a single I/O coil may be shared for two or more of incoming or outgoing data, incoming clock, or incoming carrier signal. Example coils are shown FIGS. 4, 5, and 9-14.

Figure 9:
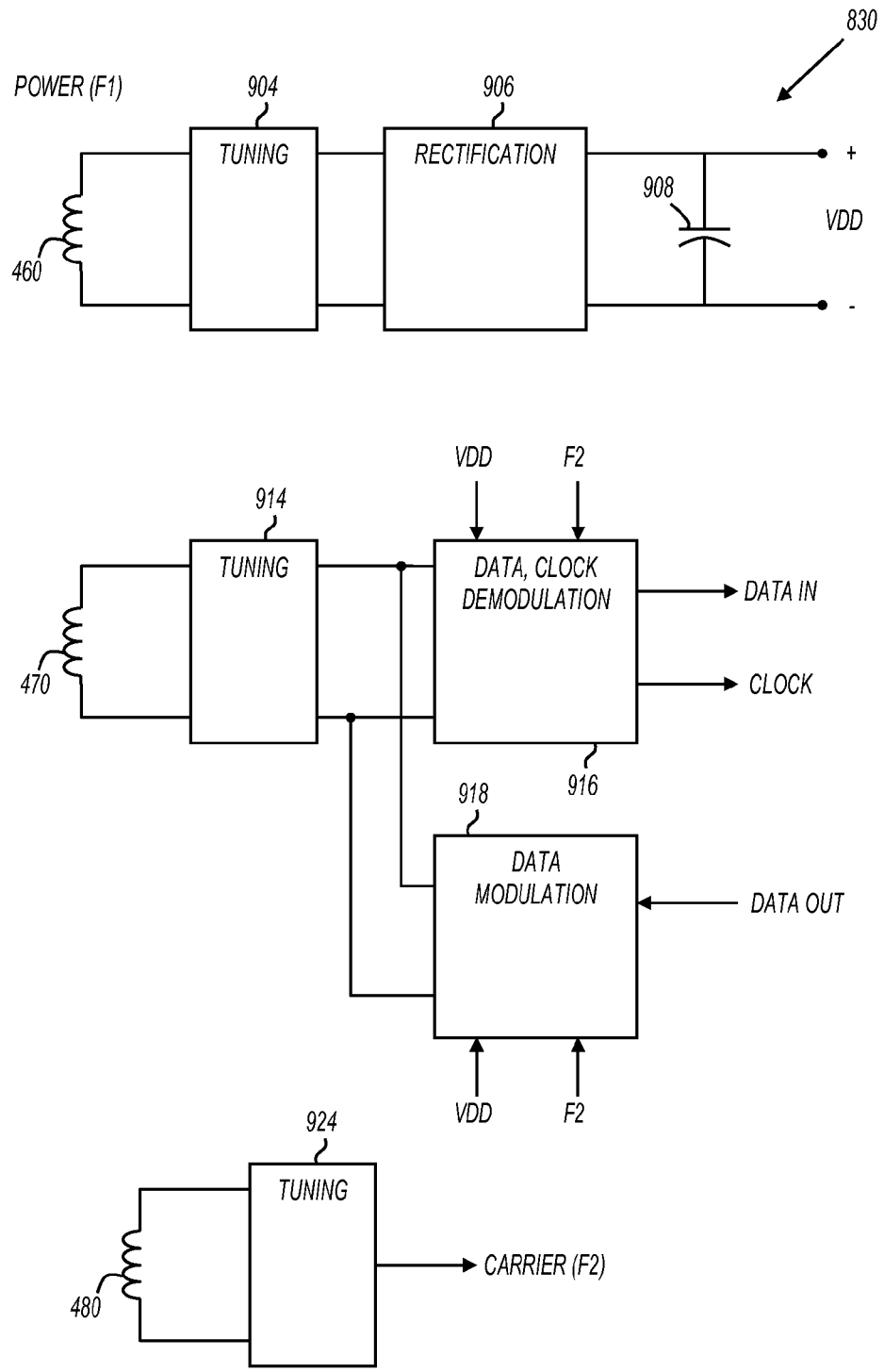
FIGS. 9-13 show block diagrams of RF sections of passive tags in accordance with various embodiments of the present invention.

FIGS. 9-13 show block diagrams of RF sections of passive tags in accordance with various embodiments of the present invention. FIG. 9 shows three conductive coils 460, 470, 480, corresponding to the conductive coils shown in FIG. 4. Conductive coil 460 is used for scavenging RF power, conductive coil 470 is used for bidirectional data communications, and conductive coil 480 is used to receive a carrier signal transmitted by the RF probe.

In embodiments represented by FIG. 9, RF section 830 includes tuning circuits 904, 914, and 924, rectification circuit 906, data and clock demodulation circuit 916, and data modulation circuit 918. In operation, conductive coil 460 is coupled to tuning circuit 904 to tune the coil to receive RF energy at a first frequency (F1) transmitted by an RF probe. Tuning circuit 904 (and all tuning circuits shown in the various figures) may include any components in any configuration useful for tuning conductive coil 460. For example, tuning circuit 904 may include parallel or series connected reactive elements. The received RF signal is rectified by circuit 906, and filtered by decoupling capacitor 908 to produce a direct current (DC) voltage (VDD) to power other circuits within the passive tag. For example, VDD may be used to power other circuits within RF section 830, as well as digital circuits (810, FIG. 8) within the passive tag.

Conductive coil 480 is electrically coupled to tuning circuit 924. The combination of coil 480 and tuning circuit 924 are tuned to receive a carrier signal at a second frequency (F2). In embodiments represented by FIG. 9, an RF probe transmits a carrier signal at F2 using a conductive coil that is paired to conductive coil 480. For example, RF probe 120 (FIG. 3) may transmit a carrier signal at F2 using conductive coil 430 (FIG. 4). The carrier signal at F2 is received by the passive tag and provided to other RF circuits within RF section 830.

Coil 470 is electrically coupled to tuning circuit 914, which is in turn electrically coupled to data and clock demodulation circuit 916 and data modulation circuit 918. Data and clock demodulation circuit 916 receives a modulated carrier signal at frequency F2, and demodulate the data and clock signals. Any suitable type of modulation may be employed and any corresponding type of frequency translation and demodulation circuitry may be included within circuits 916. In some embodiments, the data and clock signals are at KHz rates. For example, data rates may be about 10 KHz, whereas the carrier signal upon which the data is modulated may be at a few GHz.

Coil 470 and tuning circuit 914 are also electrically coupled to data modulation circuit 918. In some embodiments, data modulation circuit 918 communicates the data to the RF probe by modulating the impedance of coil 470. When the RF probe is transmitting an RF carrier, and coil 470 is inductively coupled to a coil on the RF probe, the RF probe can sense the impedance modulation and receive the data.

The combination of data and clock demodulation circuit 916 and data modulation circuit 918 form a data input/output circuit that is electrically coupled to coil 470. This combination, along with coil 470, is used for half duplex bidirectional data. Data is received when a modulated carrier is received, and data is transmitted when the impedance of coil 470 is modulated.

Figure 10:
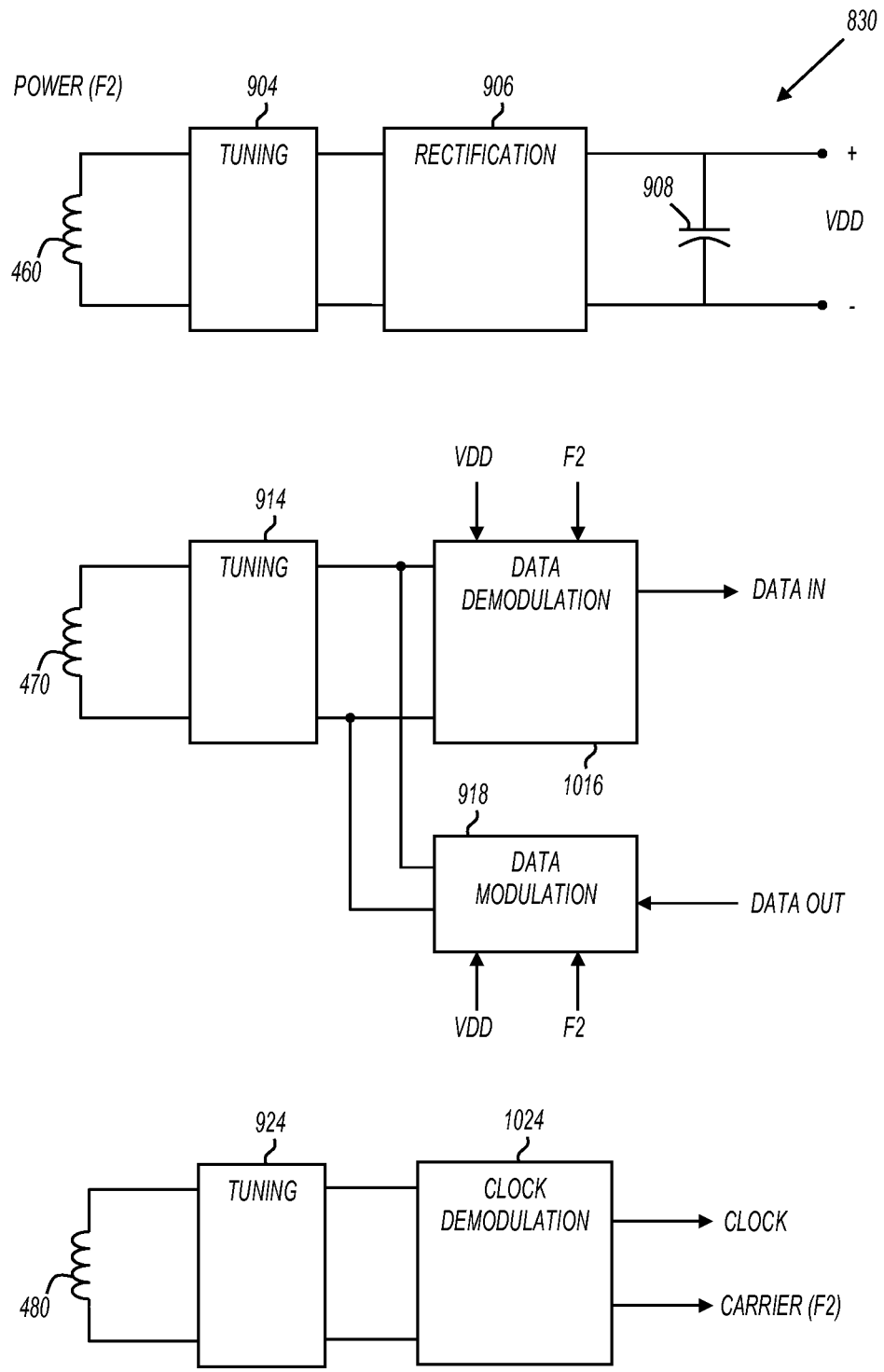

FIG. 10 shows three conductive coils 460, 470, 480, corresponding to the conductive coils shown in FIG. 4. Conductive coil 460 is used for scavenging RF power, conductive coil 470 is used for bidirectional data communications, and conductive coil 480 is used to demodulate a clock signal and to receive a carrier signal transmitted by the RF probe.

In embodiments represented by FIG. 10, RF section 830 includes tuning circuits 904, 914, and 924, rectification circuit 906, data demodulation circuit 1016, and data modulation circuit 918. In operation, conductive coil 460 is coupled to tuning circuit 904 to tune the coil to receive RF energy at a frequency (F2) transmitted by an RF probe. Tuning circuit 904 (and all tuning circuits shown in the various figures) may include any components in any configuration useful for tuning conductive coil 460. For example, tuning circuit 904 may include parallel or series connected reactive elements. The received RF signal is rectified by circuit 906, and filtered by decoupling capacitor 908 to produce a direct current (DC) voltage (VDD) to power other circuits within the passive tag. For example, VDD may be used to power other circuits within RF section 830, as well as digital circuits (810, FIG. 8) within the passive tag.

Conductive coil 480 is electrically coupled to tuning circuit 924. The combination of coil 480 and tuning circuit 924 are tuned to receive a modulated carrier signal at the same frequency (F2) used to transfer power. In embodiments represented by FIG. 10, an RF probe transmits a modulated carrier signal at F2 using a conductive coil that is paired to conductive coil 480. For example, RF probe 120 (FIG. 3) may transmit a modulated carrier signal at F2 using conductive coil 430 (FIG. 4).

In embodiments represented by FIG. 10, the carrier signal received by conductive coil 480 is modulated with a clock signal. Clock demodulation circuit 1024 demodulates a clock signal and also filters the incoming RF signal to recover the carrier signal at F2. The carrier signal at F2 is provided to other RF circuits within RF section 830.

Coil 470 is electrically coupled to tuning circuit 914, which is in turn electrically coupled to data demodulation circuit 1016 and data modulation circuit 918. Data demodulation circuit 1016 receives a modulated carrier signal at frequency F2, and demodulate the data signal. Any suitable type of modulation may be employed and any corresponding type of frequency translation and demodulation circuitry may be included within circuits 1016. In some embodiments, the data signal is at KHz rates. For example, data rates may be about 10 KHz, whereas the carrier signal upon which the data is modulated may be at a few GHz.

Coil 470 and tuning circuit 914 are also electrically coupled to data modulation circuit 918. In some embodiments, data modulation circuit 918 communicates the data to the RF probe by modulating the impedance of coil 470. When the RF probe is transmitting an RF carrier, and coil 470 is inductively coupled to a coil on the RF probe, the RF probe can sense the impedance modulation and receive the data.

The combination of data demodulation circuit 1016 and data modulation circuit 918 form a data input/output circuit that is electrically coupled to coil 470. This combination, along with coil 470, is used for half duplex bidirectional data. Data is received when a modulated carrier is received, and data is transmitted when the impedance of coil 470 is modulated.

Figure 11:
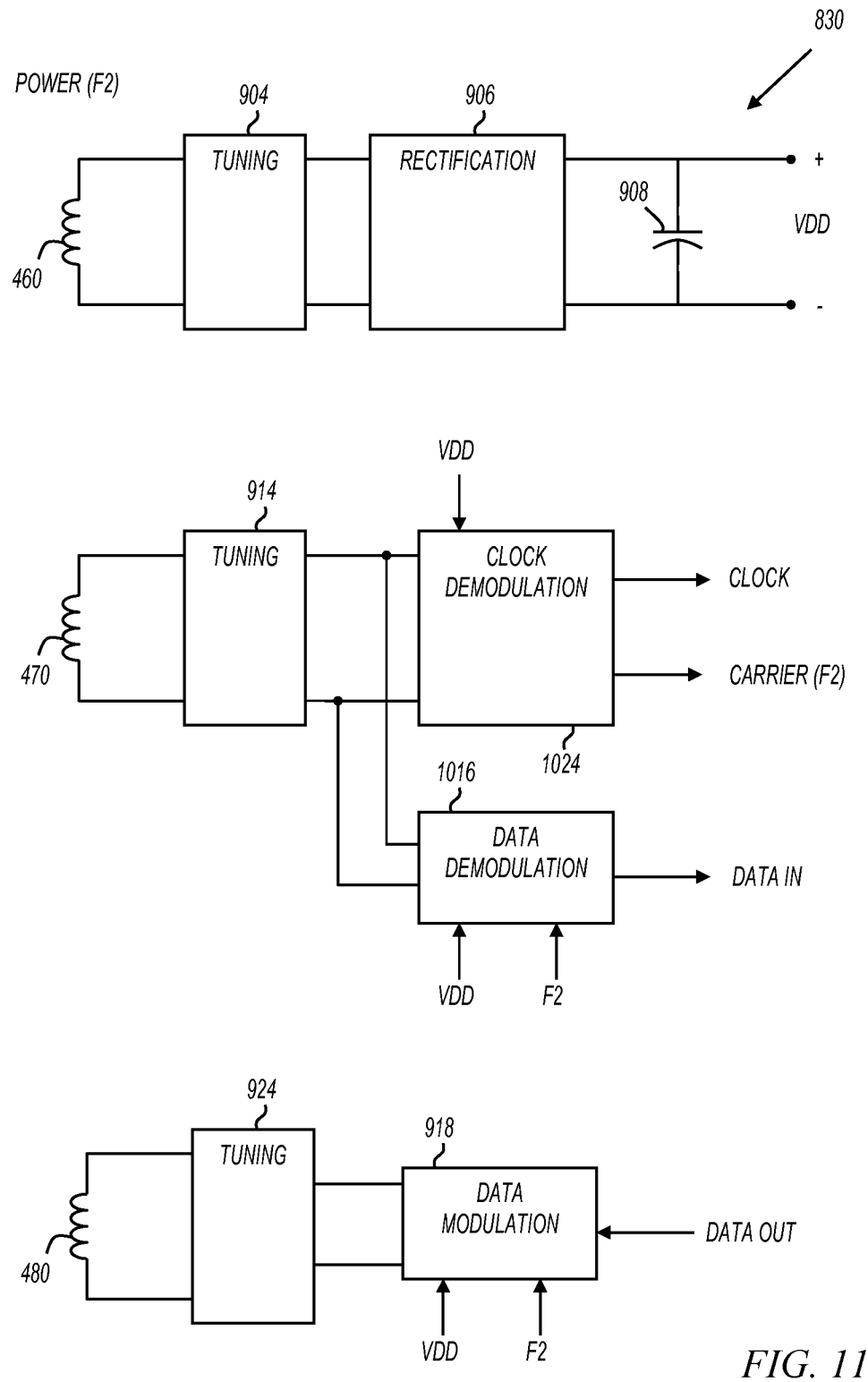

FIG. 11 shows three conductive coils 460, 470, 480, corresponding to the conductive coils shown in FIG. 4. Conductive coil 460 is used for scavenging RF power, conductive coil 470 is used for clock, carrier, and data reception, and conductive coil 480 is used for data transmission.

In embodiments represented by FIG. 11, RF section 830 includes tuning circuits 904, 914, and 924, rectification circuit 906, clock demodulation circuit 1024, data demodulation circuit 1016, and data modulation circuit 918. In operation, conductive coil 460 is coupled to tuning circuit 904 to tune the coil to receive RF energy at a frequency (F2) transmitted by an RF probe. Tuning circuit 904 (and all tuning circuits shown in the various figures) may include any components in any configuration useful for tuning conductive coil 460. For example, tuning circuit 904 may include parallel or series connected reactive elements. The received RF signal is rectified by circuit 906, and filtered by decoupling capacitor 908 to produce a direct current (DC) voltage (VDD) to power other circuits within the passive tag. For example, VDD may be used to power other circuits within RF section 830, as well as digital circuits (810, FIG. 8) within the passive tag.

Conductive coil 470 is electrically coupled to tuning circuit 914. The combination of coil 470 and tuning circuit 914 are tuned to receive a modulated carrier signal at the same frequency (F2) used to transfer power. In embodiments represented by FIG. 11, an RF probe transmits a modulated carrier signal at F2 using a conductive coil that is paired to conductive coil 470. For example, RF probe 120 (FIG. 3) may transmit a modulated carrier signal at F2 using conductive coil 230 (FIG. 4).

In embodiments represented by FIG. 11, the carrier signal received by conductive coil 470 is modulated with clock and data signals. Clock demodulation circuit 1024 demodulates a clock signal and also filters the incoming RF signal to recover the carrier signal at F2. The carrier signal at F2 is provided to other RF circuits within RF section 830.

Coil 470 and tuning circuit 914 are also electrically coupled to data demodulation circuit 1016. Data demodulation circuit 1016 receives a modulated carrier signal at frequency F2, and demodulate the data signal. Any suitable type of modulation may be employed and any corresponding type of frequency translation and demodulation circuitry may be included within circuits 1016. In some embodiments, the data signal is at KHz rates. For example, data rates may be about 10 KHz, whereas the carrier signal upon which the data is modulated may be at a few GHz.

Conductive coil 480 is electrically coupled to tuning circuit 924, which is in turn coupled to data modulation circuit 918. In some embodiments, data modulation circuit 918 communicates the data to the RF probe by modulating the impedance of coil 480. When the RF probe is transmitting an RF carrier, and coil 470 is inductively coupled to a coil on the RF probe, the RF probe can sense the impedance modulation and receive the data. In other embodiments, data modulation circuit 918 communicates the data to the RF probe by modulating and transmitting a carrier at F2.

Figure 12:
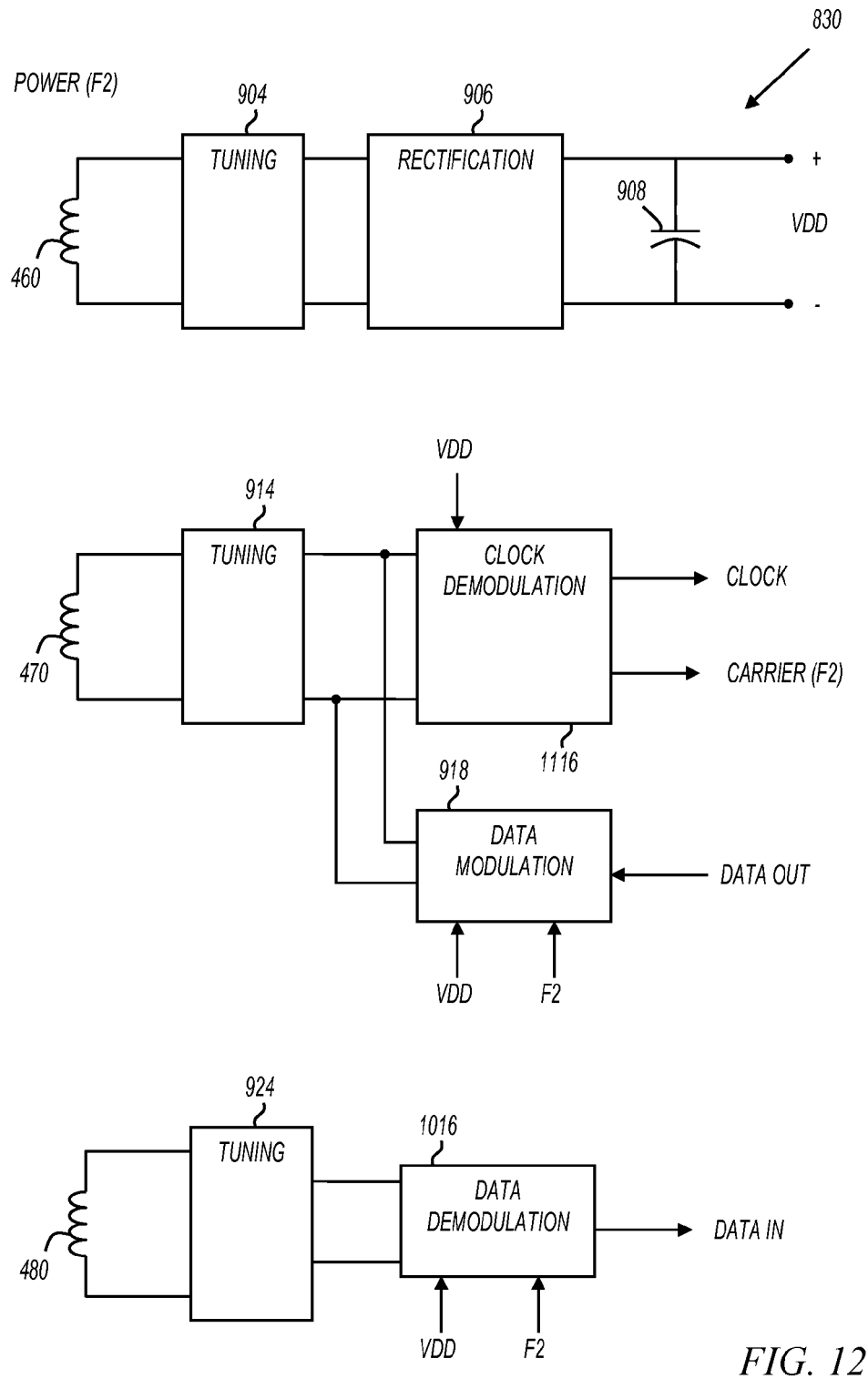

FIG. 12 shows three conductive coils 460, 470, 480, corresponding to the conductive coils shown in FIG. 4. Conductive coil 460 is used for scavenging RF power, conductive coil 470 is used for clock and carrier reception and data transmission, and conductive coil 480 is used for data reception.

In embodiments represented by FIG. 12, RF section 830 includes tuning circuits 904, 914, and 924, rectification circuit 906, clock demodulation circuit 1024, data demodulation circuit 1016, and data modulation circuit 918. In operation, conductive coil 460 is coupled to tuning circuit 904 to tune the coil to receive RF energy at a frequency (F2) transmitted by an RF probe. Tuning circuit 904 (and all tuning circuits shown in the various figures) may include any components in any configuration useful for tuning conductive coil 460. For example, tuning circuit 904 may include parallel or series connected reactive elements. The received RF signal is rectified by circuit 906, and filtered by decoupling capacitor 908 to produce a direct current (DC) voltage (VDD) to power other circuits within the passive tag. For example, VDD may be used to power other circuits within RF section 830, as well as digital circuits (810, FIG. 8) within the passive tag.

Conductive coil 470 is electrically coupled to tuning circuit 914. The combination of coil 470 and tuning circuit 914 are tuned to receive a modulated carrier signal at the same frequency (F2) used to transfer power. In embodiments represented by FIG. 11, an RF probe transmits a modulated carrier signal at F2 using a conductive coil that is paired to conductive coil 470. For example, RF probe 120 (FIG. 3) may transmit a modulated carrier signal at F2 using conductive coil 230 (FIG. 4).

In embodiments represented by FIG. 12, the carrier signal received by conductive coil 470 is modulated with a clock signal. Clock demodulation circuit 1024 demodulates a clock signal and also filters the incoming RF signal to recover the carrier signal at F2. The carrier signal at F2 is provided to other RF circuits within RF section 830.

Coil 470 and tuning circuit 914 are also electrically coupled to data modulation circuit 918. In some embodiments, data modulation circuit 918 communicates the data to the RF probe by modulating the impedance of coil 470. When the RF probe is transmitting an RF carrier, and coil 470 is inductively coupled to a coil on the RF probe, the RF probe can sense the impedance modulation and receive the data.

Coil 480 and tuning circuit 924 are electrically coupled to data demodulation circuit 1016. Data demodulation circuit 1016 receives a modulated carrier signal at frequency F2, and demodulate the data signal. Any suitable type of modulation may be employed and any corresponding type of frequency translation and demodulation circuitry may be included within circuits 1016. In some embodiments, the data signal is at KHz rates. For example, data rates may be about 10 KHz, whereas the carrier signal upon which the data is modulated may be at a few GHz.

Figure 13:
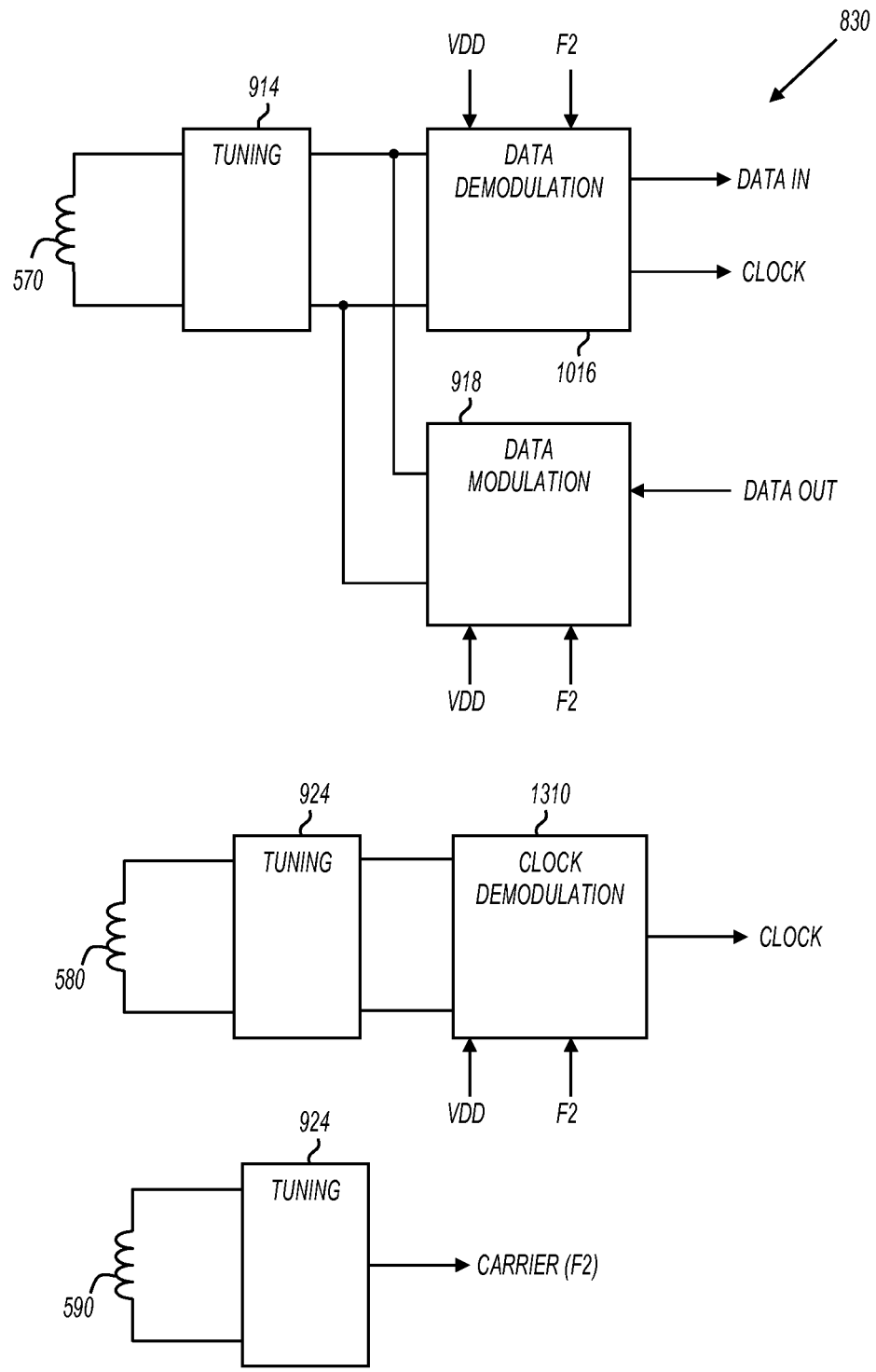

FIG. 13 shows an RF section of a passive tag that includes four conductive coils. The first conductive coil is used for RF power transfer as described above. For example, any of the RF power transfer mechanisms described above with reference to FIGS. 9-12 may be included in embodiments represented by FIG. 13. The RF power transfer circuits and the corresponding conductive coil are not shown in FIG. 13. FIG. 13 does show conductive coils 570, 580, and 590. These conductive coils are also described with reference to FIG. 5.

Data demodulation circuit 1016, data modulation circuit 918, and tuning circuit 914 are electrically coupled to conductive coil 570. These circuits and their operation are described above. Tuning circuit 924 is electrically coupled to conductive coil 590, and receives a carrier at frequency (F2). This is also described above.

Clock demodulation circuit 1310 is electrically coupled to conductive coil 580 and tuning circuit 924. In operation, clock demodulation circuit 1310 receives a modulated carrier, and demodulates a clock signal.

In embodiments represented by FIG. 13, four separate conductive coils are included on a passive tag. One is used for RF power transfer, a second is used for bidirectional data communications, a third is used for a clock signal, and a fourth is used to transmit a carrier.

Figure 14:
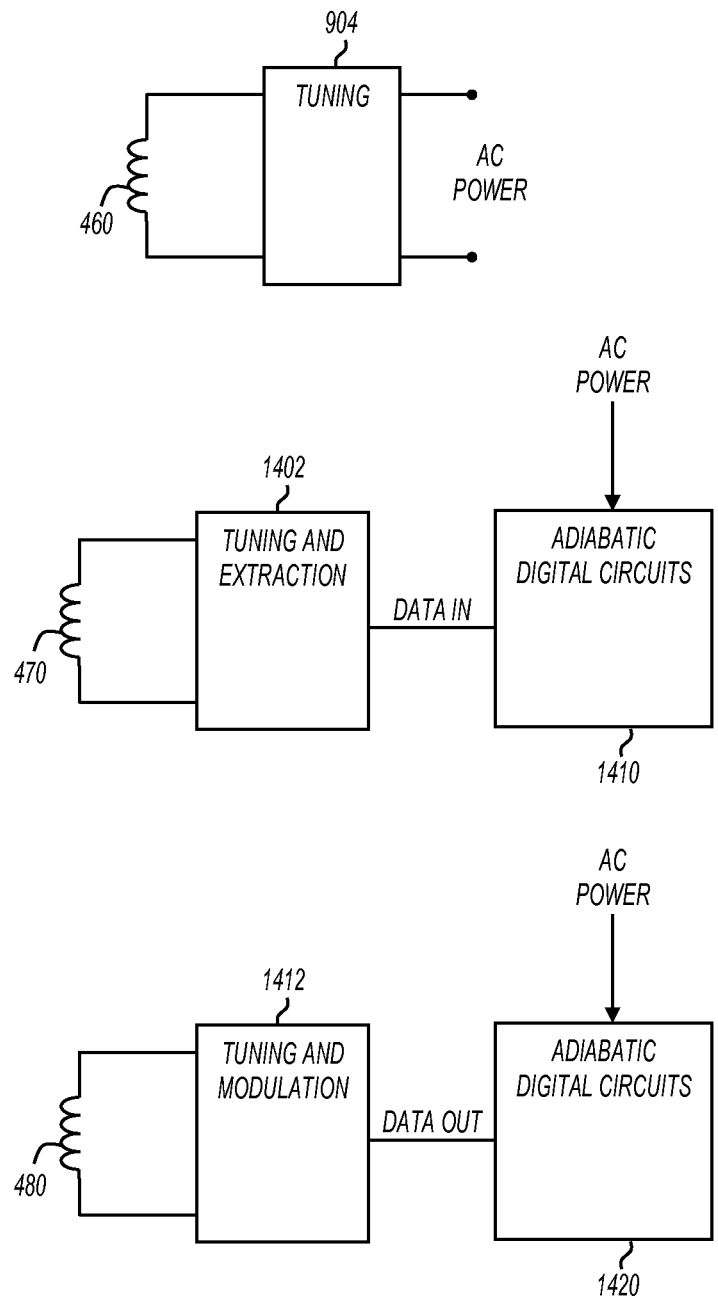
FIG. 14 shows a block diagram of a passive RF tag with adiabatic circuits.

FIG. 14 shows a block diagram of a passive RF tag with adiabatic circuits. Embodiments represented by FIG. 14 differ from the previously described embodiments in that the power conditioning does not include rectification. Instead, the RF power that is scavenged is used directly as a power source for adiabatic digital circuits. For example, as shown in FIG. 14, alternating current (AC) power is supplied directly from the RF power received from the combination of conductive coil 460 and tuning circuit 904.

Adiabatic digital circuits 1410 receive a data signal provided by tuning and extraction circuit 1402, which is in turn electrically coupled to conductive coil 470. Adiabatic digital circuits 1420 provide data to tuning and modulation circuit 1412, which is in turn coupled to conductive coil 480.

Adiabatic circuits 1410 and 1420 represent digital circuits within a passive tag such as digital circuits 810 (FIG. 8). Adiabatic circuits are good candidates for the digital circuits in passive tag 140 in part because the power transfer is already an AC signal, data rates are relatively low, and the power consumption is also very low.

Figure 15:
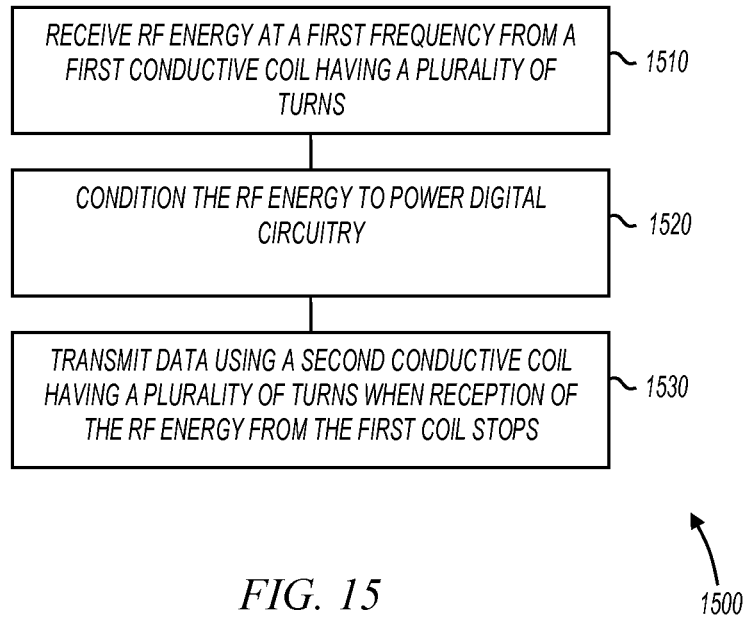
FIGS. 15-17 show flowcharts of methods in accordance with various embodiments of the present invention.

FIG. 15 shows a flowchart of methods in accordance with various embodiments of the present invention. In some embodiments, method 1500 is performed by a passive tag in accordance with various embodiments of the present invention. The various actions in method 1500 may be performed in the order presented, in a different order, or simultaneously. Further, in some embodiments, some actions listed in FIG. 15 are omitted from method 1500.

Method 1500 begins at 1510 in which RF energy is received at a first frequency from a first conductive coil having a plurality of turns. In some embodiments, the first conductive coil corresponds to coil 460 as shown in the previous figures. At 1520, the RF energy is conditioned to power digital circuits. In some embodiments, this corresponds to rectifying and filtering the RF energy to produce a DC power supply voltage suitable to power digital circuits.

At 1530, data is transmitted using a second conductive coil having a plurality of turns when reception of the RF energy from the first coil stops. In some embodiments, this corresponds to sensors 820 (FIG. 8) detecting that the RF energy is no longer being transmitted by an RF probe. For example, referring to FIG. 11, data may be transmitted using data modulation circuitry 918 when RF energy is no longer being received at conductive coil 460. The RF energy and the modulated data carrier may be at the same frequency (F2), or may be at different frequencies (F1), (F2).

Figure 16:
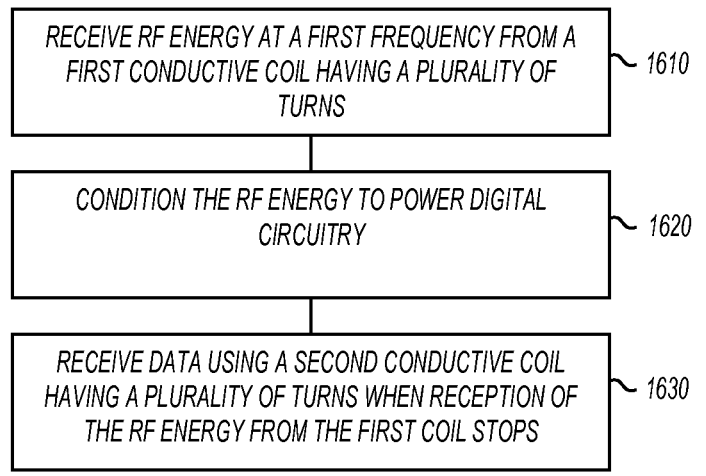

FIG. 16 shows a flowchart of methods in accordance with various embodiments of the present invention. In some embodiments, method 1600 is performed by a passive tag in accordance with various embodiments of the present invention. The various actions in method 1600 may be performed in the order presented, in a different order, or simultaneously. Further, in some embodiments, some actions listed in FIG. 16 are omitted from method 1600.

Method 1600 begins at 1610 in which RF energy is received at a first frequency from a first conductive coil having a plurality of turns. In some embodiments, the first conductive coil corresponds to coil 460 as shown in the previous figures. At 1620, the RF energy is conditioned to power digital circuits. In some embodiments, this corresponds to rectifying and filtering the RF energy to produce a DC power supply voltage suitable to power digital circuits.

At 1630, data is received using a second conductive coil having a plurality of turns when reception of the RF energy from the first coil stops. In some embodiments, this corresponds to sensors 820 (FIG. 8) detecting that the RF energy is no longer being transmitted by an RF probe. For example, referring to FIG. 12, data may be received using data demodulation circuitry 1016 when RF energy is no longer being received at conductive coil 460. The RF energy and the modulated data carrier may be at the same frequency (F2), or may be at different frequencies (F1), (F2).

Figure 17:
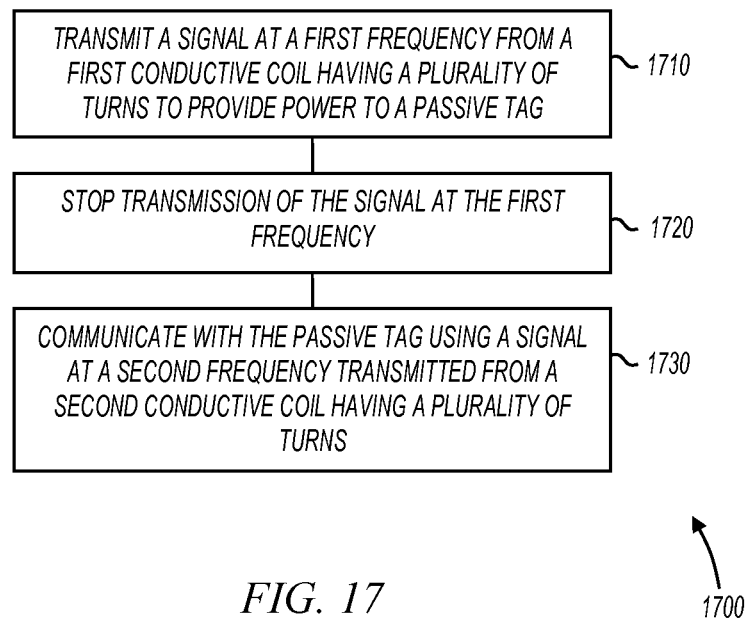

FIG. 17 shows a flowchart of methods in accordance with various embodiments of the present invention. In some embodiments, method 1700 is performed by an RF probe when communicating with a passive tag in accordance with various embodiments of the present invention. The various actions in method 1700 may be performed in the order presented, in a different order, or simultaneously. Further, in some embodiments, some actions listed in FIG. 17 are omitted from method 1700.

Method 1700 begins at 1710 in which an RF signal is transmitted at a first frequency from a first conductive coil having a plurality of turns to provide power to a passive tag. In some embodiments, this corresponds to an RF probe transmitting RF energy using conductive coil 410 (FIG. 4), which is inductively coupled to conductive coil 460 as shown in the previous figures. At 1720, the transmission of the RF signal is stopped. In some embodiments, the transmission of the RF signal is stopped after it has been transmitted for a time period long enough to power the passive tag.

At 1730, the RF probe communicates with the passive tag using a signal at a second frequency transmitted from a second conductive coil having a plurality of turns. In some embodiments, this corresponds to an RF probe transmitting a modulated carrier signal using conductive coil 420 (FIG. 4) which is inductively coupled to conductive coil 470 on the passive tag. Communications may be half-duplex when the input data and output data share a single conductive coil, or may be full-duplex when the input data and output data use separate conductive coils.

Although the present invention has been described in conjunction with certain embodiments, it is to be understood that modifications and variations may be resorted to without departing from the scope of the invention as those skilled in the art readily understand. It is to be clearly understood that the above description is made only by way of example, and not as a limitation on the scope of the invention.

What is claimed is:

1. An apparatus comprising:
   a product;
   a package to house the product; and
   a passive integrated circuit used to uniquely identify the product when the passive integrated circuit is in communication with a radio frequency (RF) probe;
   wherein the package includes a surface feature matching a feature of the RF probe to facilitate alignment of the RF probe and the passive integrated circuit, and the alignment corresponds to alignment of first and second conductive coils on the passive tag with corresponding conductive coils on the RF probe.

2. The apparatus of claim 1 wherein the surface feature comprises an indentation in a surface of the package.

3. The apparatus of claim 2 wherein the passive tag is affixed to the package within the indentation.

4. The apparatus of claim 2 wherein the indentation includes a notch to facilitate the alignment.

5. The apparatus of claim 2 wherein the indentation is in a trapezoidal shape to facilitate the alignment.

6. The apparatus of claim 1 wherein the product comprises an integrated circuit.

7. The apparatus of claim 6 wherein the package comprises an integrated circuit package.

8. An apparatus comprising:
   a passive integrated circuit having a plurality of conductive coils that must be aligned with corresponding conductive coils in a radio frequency (RF) probe to effect communications between the passive integrated circuit and the RF probe; and
   a package having an indentation within which the passive integrated circuit is located, wherein the package includes a surface feature matching a feature of the RF probe to facilitate alignment of the conductive coils on the passive integrated circuit with the conductive coils on the RF probe;
   wherein the indentation includes a notch to facilitate the alignment.

9. An apparatus comprising:
   a passive integrated circuit having a plurality of conductive coils that must be aligned with corresponding conductive coils in a radio frequency (RF) probe to effect communications between the passive integrated circuit and the RF probe; and
   a package having an indentation within which the passive integrated circuit is located, wherein the package includes a surface feature matching a feature of the RF probe to facilitate alignment of the conductive coils on the passive integrated circuit with the conductive coils on the RF probe;
   wherein the indentation is in a trapezoidal shape to facilitate the alignment.

10. The apparatus of claim 8 further comprising a second integrated circuit inside the package.

11. A radio frequency (RF) probe to communicate with a passive tag, the RF probe comprising:
    a tip at which radio frequency (RF) signals are emitted to communicate with the passive tag;
    a first conductive coil with a plurality of turns to emit a signal at a first frequency to provide a source of power to the passive tag, the first conductive coil being located at the tip of the RF probe; and
    a second conductive coil with a plurality of turns to emit an RF data signal at a second frequency, the second conductive coil being located at the tip of the RF probe;
    wherein the tip of the RF probe is formed into a shape that facilitates alignment of the first and second conductive coils on the tip of the RF probe with corresponding first and second conductive coils on the passive tag.

12. The RF probe of claim 11 wherein the shape of the tip of the RF probe matches a surface feature of a package housing the passive tag.

13. The apparatus of claim 12 wherein the tip of the RF probe includes a protrusion that matches a notch within an indentation in the package.

14. The apparatus of claim 12 wherein the tip of the RF probe is trapezoidal to match a trapezoidal indentation in the package.

15. An apparatus comprising:
    a product;
    a package to house the product; and
    a passive integrated circuit used to uniquely identify the product when the passive integrated circuit is in communication with a radio frequency (RF) probe;
    wherein the package includes a surface feature matching a feature of the RF probe to facilitate alignment of the RF probe and the passive integrated circuit, the surface feature comprises an indentation in a surface of the package, and the indentation includes a notch to facilitate the alignment.

16. The apparatus of claim 15 wherein the product comprises an integrated circuit.

17. The apparatus of claim 15 wherein the package comprises an integrated circuit package.

18. An apparatus comprising:
    a product;
    a package to house the product; and
    a passive integrated circuit used to uniquely identify the product when the passive integrated circuit is in communication with a radio frequency (RF) probe;
    wherein the package includes a surface feature matching a feature of the RF probe to facilitate alignment of the RF probe and the passive integrated circuit, the surface feature comprises an indentation in a surface of the package, and the indentation is in a trapezoidal shape to facilitate the alignment.

19. The apparatus of claim 18 wherein the product comprises an integrated circuit.

20. The apparatus of claim 18 wherein the package comprises an integrated circuit package.

* * * * *